United States Patent
Wang

(10) Patent No.: US 7,194,521 B1
(45) Date of Patent: Mar. 20, 2007

(54) HTTP CALL RECOGNITION ON A PSTN DEVICE

(75) Inventor: Xiaofan Wang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 720 days.

(21) Appl. No.: 10/025,302

(22) Filed: Dec. 18, 2001

(51) Int. Cl.
*G06F 15/16* (2006.01)
(52) U.S. Cl. .............. 709/217; 709/227; 709/203; 379/352; 379/93
(58) Field of Classification Search ............... 709/217, 709/203; 379/900
See application file for complete search history.

(56) References Cited

U.S. PATENT DOCUMENTS

| | | | | |
|---|---|---|---|---|
| 5,946,695 A | * | 8/1999 | Hinrichs et al. ........ 707/103 R |
| 6,058,169 A | * | 5/2000 | Bramnick et al. ..... 379/100.01 |
| 6,094,659 A | * | 7/2000 | Bhatia ..................... 707/104.1 |
| 6,131,095 A | * | 10/2000 | Low et al. ..................... 707/10 |
| 6,385,646 B1 | * | 5/2002 | Brown et al. ................ 709/217 |
| 6,487,196 B1 | * | 11/2002 | Verthein et al. ............ 370/352 |
| 6,693,893 B1 | * | 2/2004 | Ehlinger ..................... 370/352 |
| 6,760,046 B2 | * | 7/2004 | I'Anson et al. ............. 715/746 |
| 6,996,609 B2 | * | 2/2006 | Hickman et al. ........... 709/218 |

* cited by examiner

*Primary Examiner*—David Wiley
*Assistant Examiner*—Asghar Bilgrami
(74) *Attorney, Agent, or Firm*—Marger Johnson & McCollom, P.C.

(57) ABSTRACT

Systems and methods are disclosed for performing Hyper-Text Transfer Protocol (HTTP)-like transactions over a point-to-point connection between a client and a server. In one embodiment, the client uses Uniform Resource Locators (URLs) that identify the server by a telephone number that it can be reached at. When a user tries to access such a URL, the telephone number is dialed and a point-to-point connection is established (if it does not already exist) between the client and the server associated with that telephone number. HTTP-like transactions can then take place between the client and server, without the necessity of an Internet Protocol network with gateways, domain name servers, search engines, and network-connected hosts.

30 Claims, 3 Drawing Sheets

HTTP CALL RECOGNITION ON A PSTN DEVICE

FIELD OF THE INVENTION

The present invention relates generally to web page hosting and web page retrieval, and more particularly to systems and methods for accessing web pages using point-to-point public switched telephone network (PSTN) connections.

BACKGROUND OF THE INVENTION

The World Wide Web (hereinafter "web") is now widely accepted as a tool for information dissemination and gathering, business transaction, and recreational uses. The web is not a single entity at a single location; it is a distributed collection of web servers, each connected to at least one data network from a group of interconnected data networks that collectively form the "Internet". Those desiring to provide information or services to web users place that information on web servers, in a format such that web users can retrieve that information over an Internet connection.

Although web servers ("hosts") and web users ("clients") can in principle communicate using other protocols, most web server transactions today use the HyperText Transfer Protocol (HTTP). HTTP is a request/response protocol, i.e., the client sends resource requests to the server and the server responds to those requests by transmitting the requested resources back to the client. A resource may be a file containing text, graphics, audio, video, etc., the output of a script running on the server, a dynamically generated query result, or anything else that the host server can generate and the client can understand.

An HTTP transaction appears straightforward on the surface, but requires a great deal of behind-the-scenes effort. FIG. 1 illustrates a typical web communication scenario. The web client 22 shown in FIG. 1 can be, e.g., a web browser running on a personal computer, a personal data assistant (PDA), a web-enabled wireless phone, or some other web appliance. Web client 22 has access to some means for establishing and maintaining a data connection with an ISP (Internet Service Provider) gateway 32 via PSTN (Public-Switched Telephone Network) 30. This means can be, e.g., a traditional analog modem that can be connected to a wired analog phone line or analog wireless channel, or a digital modem that can communicate over a DSL (Digital Subscriber Line), ISDN (Integrated Services Digital Network) connection, or digital wireless channel. The modem can be, e.g., built into client 22, connected directly to a port on the client, or reachable across a local network shared by the client and the modem.

When a user of client 22 desires to reach a host on network 40, client 22 must first establish a session with ISP gateway 32, if not already connected. This generally requires client 22 accessing a line on PSTN 30, dialing a service number for gateway 32, establishing physical-layer modem communications between the gateway and the client, and then establishing a link-layer protocol such as PPP (Point-to-Point Protocol) between the gateway and the client. At some point, the user will generally supply logon information such as account name and password before the gateway will continue the logon process. PPP may also be used to communicate to the client a dynamically assigned IP (Internet Protocol) address that the client will be known by during the session. Once the session is established, client 22 and ISP gateway 32 can communicate using IP (Internet Protocol) packets, or packets of other types, encapsulated via PPP.

With an established session, the ISP can allow web client 22 general access to web servers reachable through data network 40. In one example, a user wishes to search router product literature on the Cisco Systems website, i.e., information supplied by host 46. Host 46 in this example has a domain name www.cisco.com and an IP address of 198.133.219.25. The user of web client 22, however, may know only the domain name www.cisco.com, only the company name Cisco Systems, or neither.

When the user knows the domain name for the web page that they need, the user can enter the Uniform Resource Locator (URL) (e.g., http://www.cisco.com/<resource_path>) for that web page at their web client 22. In this example URL, the service name field "http" signifies that HTTP is to be used to retrieve the resource, the field www.cisco.com identifies the domain name of the hosting web server, and the optional field resource_path identifies the specific resource on the web server that is requested. But before the resource can be requested, client 22 must establish a TCP (Transmission Control Protocol) connection to a port (generally port 80) on the server identified with IP address 198.133.219.25.

Since the client typically will not know the IP address associated with www.cisco.com, it sends a DNS (Domain Name Service) query to a specialized server that the client does know the IP address of—primary DNS name server 42. Client 22 will typically either store a hand-entered IP address for its primary DNS name server, or such an address will be supplied by the ISP during logon. Client 22 uses the DNS protocol to query DNS name server 42 as to the IP address for the domain name www.cisco.com. DNS name server 42 maintains a database that cross-references domain names with IP addresses and/or other DNS name servers. DNS name server 42 may know the answer to this query, but more typically, it will search out the answer on another DNS name server that it can reach, in this case DNS name server 44. DNS name server 44 is a root name server for the domain cisco.com, and can supply the requested IP address (e.g., 198.133.219.25).

Client 22 uses the retrieved IP address to open a TCP connection to port 80 on the domain server www.cisco.com. Client 22 then sends an appropriate HTTP message, such as GET /<resource_path>HTTP/1.1, across the connection. This message will prompt a return message from host 46, which, if successful, will contain the resource resource_path.

When the user does not know a URL or a domain name associated with the web information that they are seeking, other steps will be required in addition to those described above. For instance, search engine host 48 represents a commercial search engine of the type that builds extensive databases linking domain names and URLs to keywords. By accessing search engine host 48, a user can enter a request such as "Cisco router" and obtain matching entries for URLs and domain names matching the request. Since the format of search and result screens are themselves web pages, accesses to search engine host 48 are themselves HTTP operations requiring URLs, domain names, IP addressing, and at least one DNS name server request.

SUMMARY OF THE INVENTION

The World Wide Web, as described in the background, provides a remarkably resilient scheme for finding and accessing the resources associated with literally millions of web server domain names. Because of its limitations, however, this scheme does not meet the needs of all users. For instance, a user that does not know information sufficient to initiate a successful search may be unable to locate a desired web site. This same result may occur if the search engine used has outdated or missing information on the desired web site, or if the DNS entry for the web site is outdated. In any case, the user will go through a number of steps, including logging on to an ISP and initiating one or more searches, before the required information can be downloaded. And even if secure HTTP (https) is used, at least some portions of the session are vulnerable to eavesdropping.

Some website owners may also find drawbacks in the general web scheme. Connecting a server to a data network may leave the server vulnerable to attack by hackers. It may be difficult to ensure the privacy of transactions initiated by customers or clients. The web site owner must also register a domain name and pay to have their server connected to the web or their web site hosted on a commercial server.

Due at least in part to the issues identified above, it is recognized herein that a class of web browser applications exist that could be better served outside the general framework of the web. In general, this disclosure proposes a method, system components, and system for conducting HTTP (or HTTP-like) transactions over point-to-point PSTN connections.

BRIEF DESCRIPTION OF THE DRAWINGS

The invention may be best understood by reading the disclosure with reference to the drawing, wherein.

DETAILED DESCRIPTION

In the following description, the terms "point-to-point HTTP", "HTTPP" (HyperText Transfer Protocol-Point), and variants thereof, are used to describe direct HTTP-like transactions between a client and a server over the PSTN but without the necessity of an intervening packet-routing network and networking accoutrements. Although HTTP describes a set of standards commonly in use today—and therefore forms a base for one preferred message implementation—it is acknowledged that the functionality described herein need not map directly to HTTP messages in order to work. And although in preferred embodiments the client appears to be directly connected to the server, tunneling protocols or similar strategies may be used within the scope of "HTTPP".

The term "HTTP" is a term of art, and refers to one or all of several different versions of a specific protocol, the HyperText Transfer Protocol. As used in the following description and claims, however, the term "HTTP" includes not only the art definition, but also any protocol that is analogous to HTTP.

A contrast between prior art web serving and a typical embodiment of the present invention serves here as an introduction to the more detailed operational concepts presented below. For instance, the prior art retrieval of an HTTP resource from a hosting server involves: connecting to and establishing a link-layer session with an ISP; establishing TCP connections to one or more domain name servers to retrieve the IP address for the hosting server; establishing a TCP connection to the hosting server; and requesting the HTTP resource from the hosting server. If the name of the web resource is not initially known, other steps such as querying web search engines may also be required. In contrast, the retrieval of an HTTP resource from a hosting server with an HTTPP port can involve: connecting to and establishing a link-layer session with the hosting server; and requesting the HTTP resource from the hosting server. By connecting directly to the hosting server, the need for ISPs, search engines, DNS name servers, and a connecting packet-routing network is obviated.

Figure 1:
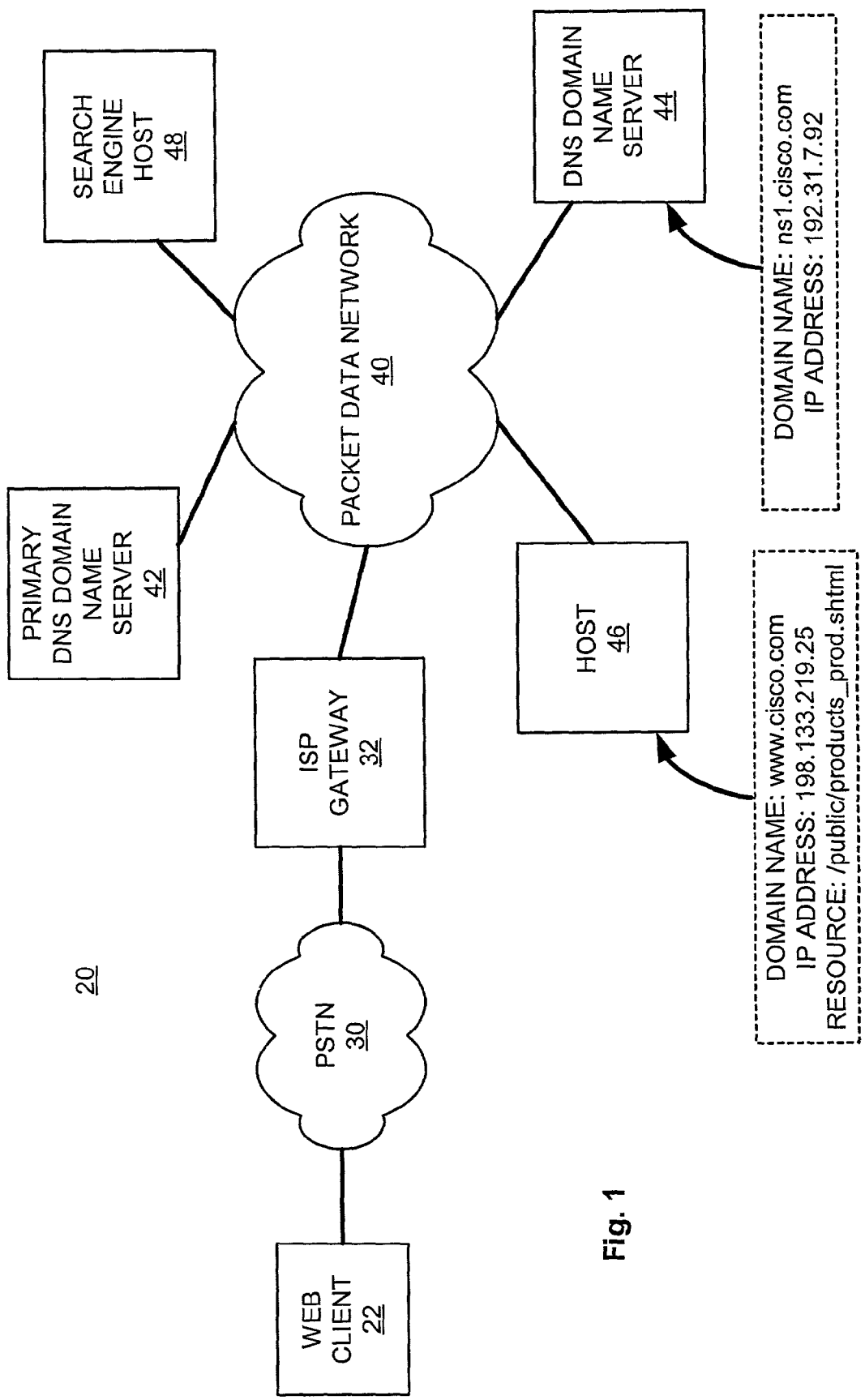
FIG. 1 illustrates a prior art collection of networked hosts, servers, and gateways used by a client to retrieve web pages from a server.
Figure 2:
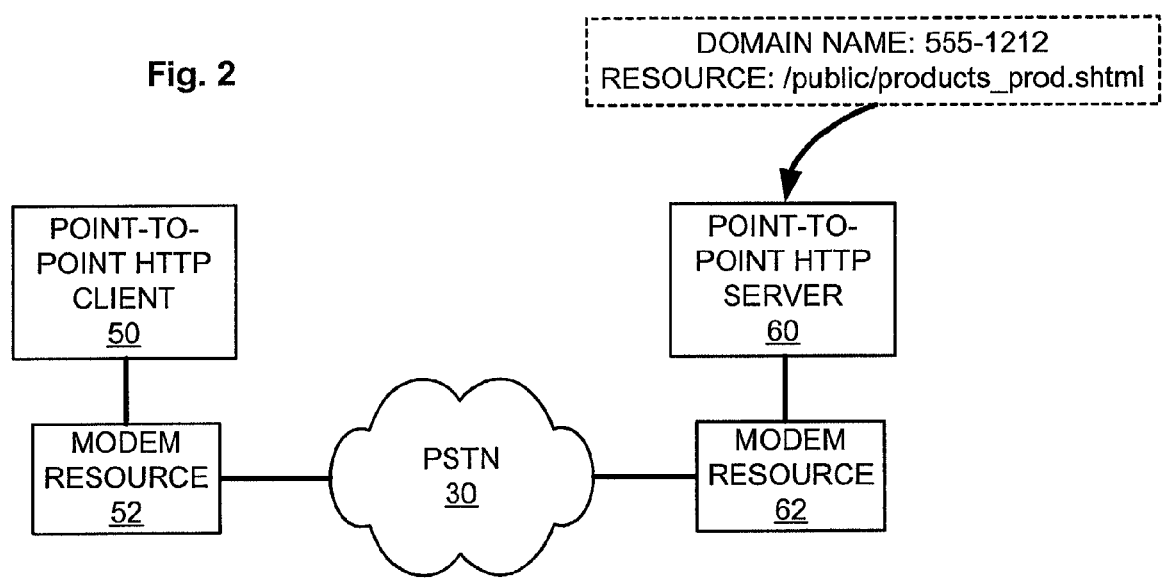
FIG. 2 illustrates a point-to-point client-server connection for exchanging "web" pages using point-to-point HTTP.

One basic network model for HTTPP is shown in FIG. 2. A HTTPP client 50 physically resides with and connects to a modem resource 52. Client 50 could be a computer web browser application that understands HTTPP transactions as well as standard HTTP transactions, a dedicated HTTPP browser application, firmware in a PDA or wireless phone, or the like. This client has the capability to interoperate with a modem resource 52, which may, e.g., comprise a driver application and modem hardware (with an PSTN connection), a driver that provides access to a digital PSTN channel such as an ISDN or wireless CDMA channel, or firmware that provides such functionality.

Also connected to PSTN 30 is an HTTPP server 60, connected through a modem resource 62. Modem resource 62 can be similar to single modem resource 52. It may also be more complex, such as part of a pooled modem resource connected to a T1 or E1 trunk, or other resource that is part of a line interface that can handle multiple PSTN-connected clients. HTTPP server 60 contains the messaging functionality for interoperating with an HTTPP client, the functionality for setting up an HTTPP session, and in a simple example, also stores the resources that can be requested by HTTPP clients over connections to that server.

As an example of HTTPP server operation, consider a modem resource 62 that can be reached over PSTN 30 by dialing the number 555-1212. This number could conceivably be dedicated to serving HTTPP sessions, or it might support other types of connections as well, such as voice sessions, standard modem data sessions with other protocols, fax sessions, etc. In one embodiment, the modem resource 62 could identify an incoming HTTPP call from other types of calls by a unique tone or tones (overlapping or in sequence), transmitted over the line after the call is answered. An HTTPP call could also be identified in caller ID (CID) information. Or, an HTTPP call may appear as any other data/modem call, with HTTPP requests appearing once the physical modem connection with the client-side modem has been established.

Whether or not modem resource 62 distinguishes the call as an HTTPP call, eventually the server must establish higher layers of communication with a client in order to serve HTTPP requests from that client. In some embodiments, the lower layers of the communication stack utilize familiar protocols: PPP (Point-to-Point Protocol) or SLIP (Serial Line Interface Protocol) for link layer connectivity; Internet Protocol (IP) for network layer connectivity; and TCP (Transmission Control Protocol) or UDP (Uniform Datagram Protocol) for transport layer connectivity. The use of familiar protocols in the stack, although easy to implement, is not required; in many embodiments SLIP or PPP could interface directly to a defined HTTPP packet type since the communication path is point-to-point.

Figure 3:
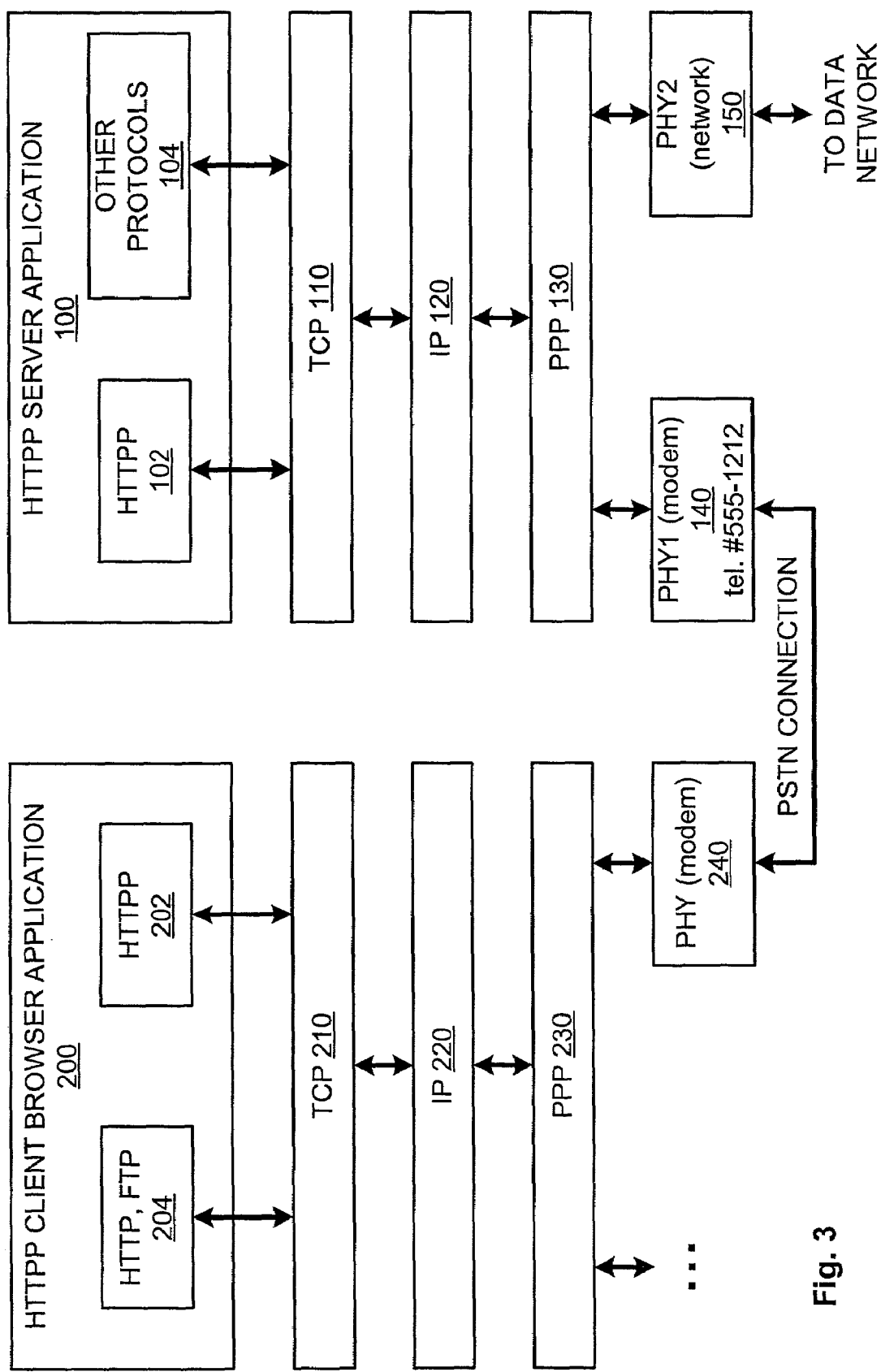
FIG. 3 shows protocol stacks for one embodiment interfacing a point-to-point HTTP client with a point-to-point HTTP server.

FIG. 3 shows an exemplary server and client protocol stack utilizing PPP, IP, and TCP. When a client modem dials the 555-1212 telephone number associated with the modem 140 at PHY1, the two modems establish a physical link represented as the connection between the client physical layer PHY 240 and the server physical layer PHY1 140. PPP drivers 130 and 230 then establish a link layer session for the client. If the server and client will be exchanging packets via IP and TCP, the server may assign the client an IP address to be used for the session, and inform the client of the server's IP address. It should be noted that the networking services of IP addressing are not strictly necessary for preferred embodiments. IP is convenient because it allows the use of TCP flow control between the client and server.

Once IP addresses have been established, the client can request a TCP/IP connection to an appropriate port on the host, e.g., a port set aside for HTTPP traffic. Within the client, an HTTPP driver 202 formats HTTPP requests for the server and passes those requests to TCP 210 for forwarding to the server. Within the server, an HTTPP driver 102 receives the requests from TCP 110, and supplies responses to TCP 110 for forwarding back to TCP 210. Note that TCP drivers 110 and 210 can interface with other applications and protocols as well, e.g., protocols 104 and 204, respectively (other protocols that might be supported can include HTTP, FTP, etc.). These interfaces can exist for use in other connection scenarios, and need not (and preferably will not) be available for use by an HTTPP client.

As shown in FIG. 3, HTTPP driver 202 is a driver associated with an HTTPP-enabled client browser application 200. In one embodiment, client browser application 200 can recognize HTTPP commands by the URL, e.g., a URL for the server running HTTPP server application 100 could take the form:

httpp://555-1212/<resource_path> where "httpp" identifies the protocol, "555-1212" indicates the PSTN number through which the server can be reached, and "<resource_path>" is the pathname on the server for the requested resource.

When a user requests a URL with the "httpp" protocol identifier, browser application 200 sends the URL to HTTPP driver 202. In this example, when HTTPP driver 202 receives the URL, it parses the PSTN number. HTTPP driver 202 tracks any connection to an HTTPP server that is open. If an HTTPP connection is open, driver 202 compares the parsed PSTN number to the open number. If the numbers are the same, a connection to the URL is already open. If the numbers are different, the open connection is closed (unless the client has the hardware capability to have more than one open PSTN connection).

When a connection to the parsed number is not already open, HTTPP driver 202 requests that the parsed number be dialed, and an HTTPP connection to the server is set up as previously described. In an application where HTTPP access to a server is limited to authorized clients, the server can enforce password protection at this time. This protection can use standard connection protocols, such as the PPP PAP (Password Authentication Protocol) or CHAP (Challenge Handshake Authentication Protocol). As one alternative, the server can also present a log-on page to the client that must be passed successfully before other HTTPP pages can be viewed.

With an open HTTPP connection, the browser application can send HTTPP messages to the server. These messages can be analogous to—or even identical to—HTTP messages. The HTTPP server responds with requested resources, which can then be displayed by the client browser application.

One exemplary use of HTTPP is as part of a retail service offered by a business. For instance, a financial institution could offer a telephone number that one could dial to check accounts and conduct transactions, using HTML (HyperText Markup Language) and other common browser resources to present information to a consumer on their browser. Although this functionality exists today as web-based applications, an implementation on an HTTPP server offers features absent from the web-based application. First, an additional layer of security exists since information does not pass over the web, and server-side information can be kept in a location that is inaccessible from the web. The origination point for each HTTPP session can also be traced and/or logged. Second, the consumer needs no Internet Service Provider (ISP) to access this service, and the business need not pay to have a web site hosted and secured. Mobile consumers can locate a business number using telephone directory services, and need not rely on web-based search engines or navigate down through inquiry screens to find their local branch. Of course, nothing prevents web-based services from listing HTTPP URLs as "clickable" links that, when selected, allow an HTTPP-equipped client to initiate an HTTPP session with the server listed in the URL.

Business and government uses for an HTTPP service are virtually unlimited. For instance, consumers could call a local theatre to access showtimes, purchase tickets, etc., or view a menu and place an order at a restaurant, all while driving there. Employees can view and/or enter data on their employer's servers without placing that data on the web or going through a firewall.

An HTTPP server can also be implemented on a home-based computer or PSTN-connected appliance. A homeowner sets the HTTPP computer or appliance to answer a PSTN phone line (the computer or appliance could distinguish and handle other call types, e.g., voice, fax, standard data connection, as well). The homeowner then sets the HTTPP resources that are available from the computer or appliance. For instance, the HTTPP server may offer home security system resources, such as tools for setting the security system, or tools for monitoring the system or components thereof, such as a security camera or microphone. The HTTPP server may offer resources to control lighting, HVAC, or to access to computer files. A default or "home page" resource can provide an easy means of selecting from the other available resources. A homeowner, or others whom would be granted access by the homeowner, can then access these resources remotely and securely after connecting to the server.

Although in many embodiments the modem and server will physically connect, other service modes are possible. For instance, the modem resource could exist on a NAS (Network Access Server) that creates or maintains secure data network tunnels to multiple web-hosted HTTPP servers (the NAS could provide other services as well). This capability can be transparent to the client, which has no knowledge that its HTTPP communications are encapsulated by a first box and passed over a data network to a second box. In one possible mode of operation, the NAS establishes a link-layer connection to a dial-in client. The fact that the client is an HTTPP client, as well as the identity of the HTTPP server the client is trying to reach, can be established at the NAS by, e.g., establishing a 1:1 relationship between HTTPP servers and dialed numbers. The NAS thus relates the client to the tunnel needed to reach the desired server, and tunnels packets between its link-layer connection to the client and the HTTPP server.

The HTTPP server need not physically host the resources requested by an HTTPP client. Referring back to FIG. 3, the HTTPP server application is illustrated as having a second physical connection 150 (PHY2) to a data network. The PHY2 connection can comprise a LAN to other servers or devices that physically host requested resources. In such a model, server application 100 has a remote retrieval service to relate a resource requested by an HTTPP client to the hosting device for that resource, gather that resource from its physical location, and forward it to the appropriate HTTPP client.

When the server application allows HTTPP clients to access resources that are not physically present on that server, the server application accesses an information base for indexing resources to their physical locations. This could entail an exhaustive database relating each resource to its host. Alternately, the resource path could include a component that itself indicates the physical location, e.g.: "/page-.htm" for a resource hosted on the server, and "/host1/page.htm" for a resource located on a host "host1" known to and connected to the server.

Using a technique similar to including the resource path component, a web-connected HTTPP server can also be designed to serve web pages to an HTTPP client, without that client having direct access to the web. For instance, the URL httpp://555-1212/www.cisco.com/public/products_prod.shtml results in the HTTPP client connecting to the HTTPP server at 555-1212, and requesting a resource with a command GET /www.cisco.com/public/products_prod.shtml HTTPP/1.1

The HTTPP server parses this resource, and if so configured, can respond by performing a DNS lookup on the web host www.cisco.com, opening a TCP/IP connection to port 80 of the host at returned DNS address 198.133.219.25, requesting the resource from the remote host by issuing an HTTP command GET /public/products_prod.shtml HTTP/1.1

When host 198.133.219.25 returns the requested resource, the HTTPP server forwards the resource on to the HTTPP client.

A few embodiments have been described above. As is traditional in the computer arts, much of the functionality described for HTTPP servers and clients according to embodiments of the invention can be implemented as software applications designed to run on processors. Accordingly, embodiments of the present invention can be embodied in a variety of different computer-readable media that contain computer instructions that, when executed, cause a processor or processors, to perform or cause to be performed the desired functionality.

The embodiments described herein are presented to inform one skilled in the art of the basic concepts necessary to construct and operate devices and applications within the scope of the present invention. Other modifications, permutations, choices of protocols, and embodiments exist for an embodiment of an HTTPP client, server, and method of use. Such will be apparent to those skilled in the art upon reading this disclosure.

What is claimed is:

1. A method of operating a client that retrieves resources using HyperText Transfer Protocol (HTTP) commands, the method comprising:
   parsing a domain name field for a telephone number that identifies a point-to-point HTTP server;
   comparing the parsed telephone number to one or more open telephone numbers identifying one or more open point-to-point HTTP connections;
   when an open telephone number matching the parsed telephone number does not exist, accessing a public-switched-telephone-network line;
   dialing, on the accessed line, the parsed telephone number for the point-to-point HTTP server;
   indicating that the client requests termination of the line as an HTTP connection to the point-to-point HTTP server; and
   establishing a link layer connection with the point-to-point HTTP server using physical addressing;
   interacting with the point-to-point HTTP server over the accessed line and over the established link layer connection using non-packetized HTTP protocol requests and responses without the necessity of an intervening packet-routing network;
   wherein interacting with the point-to-point HTTP server does not require connecting to an Internet Service Provider (ISP).

2. The method of claim 1, wherein the domain name field is included in a Uniform Resource Locator (URL) and is associated with a Domain Name Service (DNS) query.

3. The method of claim 2, wherein the domain name field does not include a domain name.

4. The method of claim 2, wherein the URL indicates a point-to-point-HTTP-reachable resource by the presence of a telephone number in the domain name field.

5. The method of claim 1, wherein indicating that the client requests termination of the line as an HTTP connection is accomplished over the PSTN and comprises transmitting at least one tone indicative of a point-to-point HTTP session, on the accessed line.

6. The method of claim 1, wherein indicating that the client requests termination of the line as an HTTP connection is accomplished over the PSTN and comprises requesting a Transmission Control Protocol (TCP) connection to a TCP port on the server designated for point-to-point HTTP service.

7. A method of operating a point-to-point HyperText Transfer Protocol (HTTP) server associated with a telephone number, the method comprising:
   monitoring a public-switched-telephone-network line for incoming calls;
   identifying an incoming call as established by a client that parsed the associated telephone number from a domain name field for comparison to one or more open telephone numbers;
   providing a link layer connection with the client, the link layer connection established using layer two physical addressing; and
   interacting with the client served by the link layer connection using non-packetized HTTP requests and responses;
   wherein interacting with the client does not require connecting to, or communicating with, an Internet Service Provider (ISP).

8. The method of claim 7, further comprising detecting that the incoming call is of a point-to-point call type by detecting a signal comprising at least one tone on the public-switched-telephone-network line, the signal indicative of a point-to-point HTTP call type.

9. The method of claim 7, further comprising detecting that the incoming call is of a point-to-point call type by designating a Transmission Control Protocol (TCP) port on the server for point-to-point HTTP service, and associating the incoming call requesting a TCP connection to that TCP port as a request for point-to-point HTTP service.

10. The method of claim 7, further comprising requesting authentication of the client as an authorized user.

11. The method of claim 7, further comprising parsing a resource path present in an HTTP request received from the client, determining whether the resource path is for a local resource available at the server, and when the resource path is for a remote resource not available at the server, determining whether the server can obtain the remote resource from a remote host.

12. The method of claim 11, where determining whether the server can obtain the remote resource from the remote host comprises parsing a host identifier from the resource path.

13. The method of claim 12, further comprising comparing the host identifier to identifiers contained in an information base available to the server.

14. The method of claim 11, wherein when the server determines that the remote resource is available from the remote host, the method further comprises requesting the remote resource from the remote host, receiving the remote resource from the remote host, and forwarding the remote resource to the client.

15. A point-to-point HyperText Transfer Protocol (HTTP) server associated with a telephone number, the HTTP server comprising:
   means for connecting the server to a public-switched-telephone-network line;
   means for identifying an incoming call as established by an HTTP client that parsed the associated telephone number from a domain name field for comparison to one or more open telephone numbers;
   means for establishing a point-to-point HTTP session with the HTTP client on the public-switched-telephone-network line when the incoming call from the HTTP client is detected; and
   means for interacting with the HTTP client over an established point-to-point HTTP session without the necessity of packet switched communications, an intervening packet-routing network, an Internet Service Provider (ISP) or a domain name lookup server;
   wherein the established point-to-point HTTP session is a link layer connection generated independently of a network address for the HTTP server by using a physical address of the HTTP server.

16. The server of claim 15, further comprising means for serving HTTP requests from the HTTP client for resources that do not reside on the HTTP server.

17. A point-to-point HyperText Transfer Protocol (HTTP) server associated with a telephone number, the HTTP server comprising:
   a modem resource capable of connection to a Publicly Switched Telephone Network (PSTN) line such that, when connected to the PSTN line, the modem resource can establish a link layer connection with a client using physical addressing;
   the modem resource further capable of identifying an incoming call received over the public-switched-telephone-network line and initiated by the client that parsed the associated telephone number from a domain name field for comparison to one or more open telephone numbers;
   one or more processors to establish the link layer connection with the client using physical addressing; and
   a point-to-point HTTP service capable of serving non-packetized HTTP requests received over the established link layer connection from the client via the modem resource without the necessity of an intervening packet-routing network.

18. The server of claim 17, wherein the modem resource is capable of establishing multiple link layer connections to different clients, and wherein the point-to-point HTTP service is capable of serving concurrent HTTP requests from multiple clients via the modem resource.

19. The server of claim 18, further comprising a Transmission Control Protocol (TCP) driver, wherein each of the different clients connects to the server by requesting a connection to a TCP port designated for the service, and the service identifies the different clients by TCP socket.

20. The server of claim 17, further comprising a default resource to be returned to the client when the client submits an empty resource request.

21. The server of claim 17, further comprising an HTTP remote retrieval service capable of serving remote resources to a client, where those remote resources are not physically located on the server but are hosted on a separate host connected to the server by a data network.

22. The server of claim 17, wherein the modem resource comprises a data network tunnel to a remote network access device.

23. An HyperText Transfer Protocol (HTTP)-enabled appliance comprising:
   one or more processors to parse a domain name field for a telephone number that identifies a point-to-point HTTP server, to compare the parsed telephone number to one or more open telephone numbers identifying one or more open point-to-point HTTP connections;
   a public-switched-telephone-network modem to access a public-switched-telephone-network line when an open telephone number matching the parsed telephone number does not exist;
   the processors further capable of operating in conjunction with the public-switched-telephone-network modem so as to establish a link layer point-to-point HTTP session with the point-to-point HTTP server without being provided a domain name or a network address for the point-to-point HTTP server; and
   a web browser capable of generating an HTTP request for transmission over the established link layer point-to-point HTTP session and capable of receiving a response to that HTTP request over the established link layer point-to-point HTTP session without being provided a domain name or a network address for the point-to-point HTTP server.

24. An HyperText Transfer Protocol (HTTP)-enabled appliance comprising:
   means for parsing a domain name field for a telephone number that identifies a point-to-point HTTP server;
   means for comparing the parsed telephone number to one or more open telephone numbers identifying one or more open point-to-point HTTP connections;
   means for initiating a data call over a public-switched-telephone network using a physical address to establish a link layer point-to-point HTTP session with the point-to-point HTTP server when an open telephone number matching the parsed telephone number does not exist;

means for generating an HTTP request for transmission over the established point-to-point HTTP session; and means for receiving a response to the HTTP request over the established point-to-point HTTP session without the necessity of an intervening packet-routing network and without the necessity of a network address exchange.

25. An apparatus comprising a computer-readable medium containing computer instructions that, when executed, cause a processor or multiple communicating processors to perform a method for operating a client that retrieves resources using HyperText Transfer Protocol (HTTP) commands, the method comprising:

parsing a domain name lookup field for a telephone number that identifies a point-to-point HTTP server;

determining whether an open HTTP connection having the telephone number exists;

when the open HTTP connection having the telephone number does not exist, accessing a public-switched-telephone-network line;

dialing, on the accessed line, the parsed telephone number for the point-to-point HTTP server;

indicating that the client requests termination of the line as an HTTP connection to the point-to-point HTTP server;

establishing a link layer connection with the point-to-point HTTP server using physical addressing; and interacting with the point-to-point HTTP server over the accessed line using framed HTTP protocol requests and responses.

26. An apparatus comprising a computer-readable medium containing computer instructions that, when executed, cause a processor or multiple communicating processors to perform a method for operating a point-to-point HyperText Transfer Protocol (HTTP) server associated with a telephone number, the method comprising:

monitoring a public-switched-telephone-network line for incoming calls;

receiving an incoming call generated by a client that parsed the associated telephone number from a domain name field for comparison to one or more open telephone numbers;

comparing a transmitted indicator included in the received incoming call to a predefined indicator;

when the transmitted indicator matches the predefined indicator, terminating the received incoming call with a call connection to the server;

establishing a link layer connection with the point-to-point HTTP server using physical addressing; and interacting with the client served by the connection using framed HTTP requests and responses without the necessity of an intervening packet-routing network.

27. The method of claim 1 further comprising closing an open connection associated with the open telephone number when the open telephone number does not match the parsed phone number.

28. The HTTP-enabled appliance of claim 23 further comprising the processor opening a circuit switched connection when a telephone number substitutes a domain name in a domain name field.

29. The HTTP-enabled appliance of claim 24 wherein a presence of the telephone number in a Uniform Resource Locator (URL) controls circuit switched connectivity.

30. The method of claim 25 wherein a non-Internet-Service-Provider (ISP) connection is established with a website in response to the presence of the telephone number in a Uniform Resource Locator (URL) and an ISP connection is established with the website in response to the presence of a domain name in the URL.

* * * * *